Dec. 11, 1956 K. A. ALBERS 2,773,486
VALVE MEANS FOR A FLUID PRESSURE SYSTEM
Filed Feb. 16, 1955 3 Sheets-Sheet 1
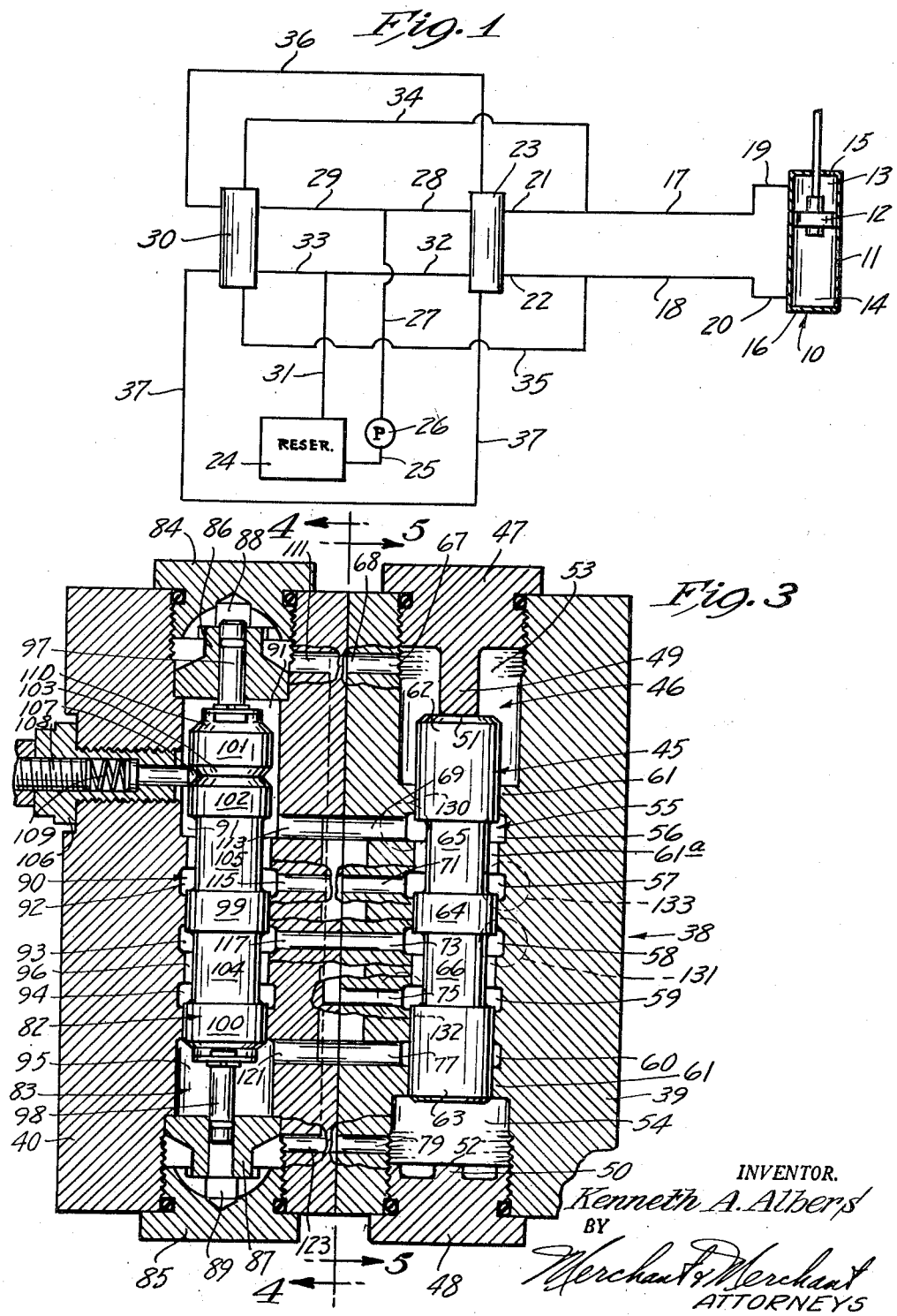
INVENTOR.
Kenneth A. Albers
BY
Merchant & Merchant
ATTORNEYS Dec. 11, 1956  K. A. ALBERS  2,773,486
VALVE MEANS FOR A FLUID PRESSURE SYSTEM
Filed Feb. 16, 1955  3 Sheets-Sheet 2
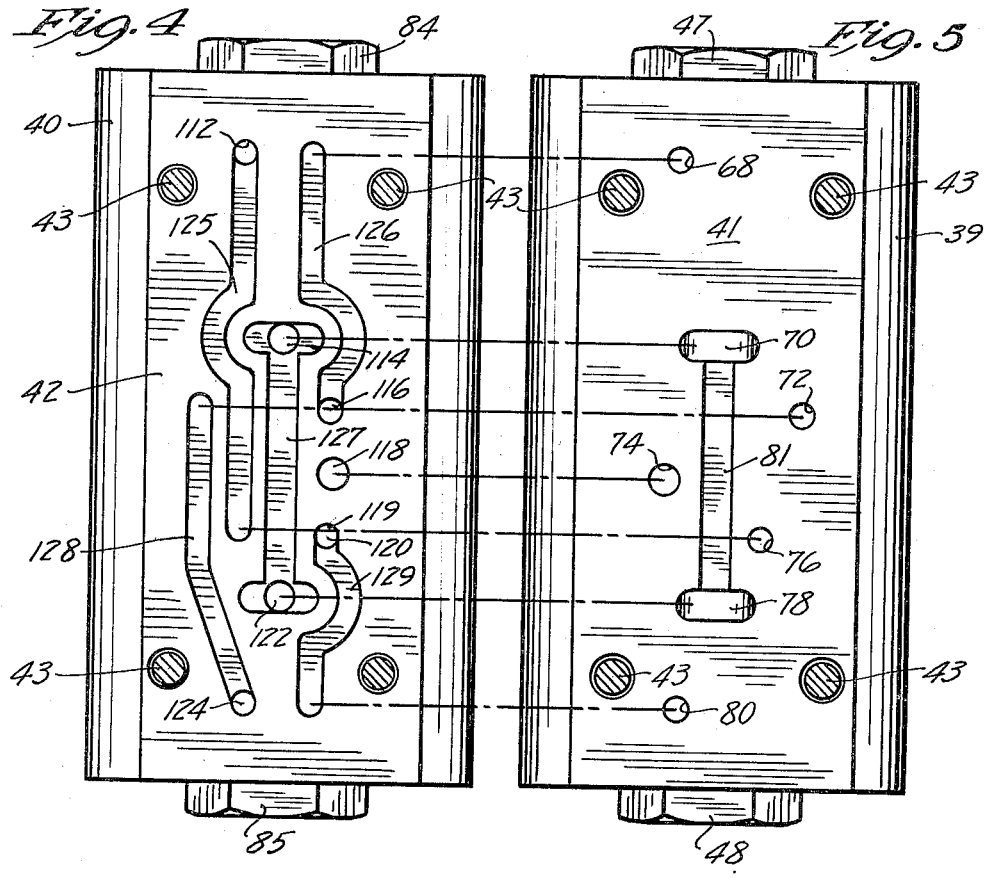
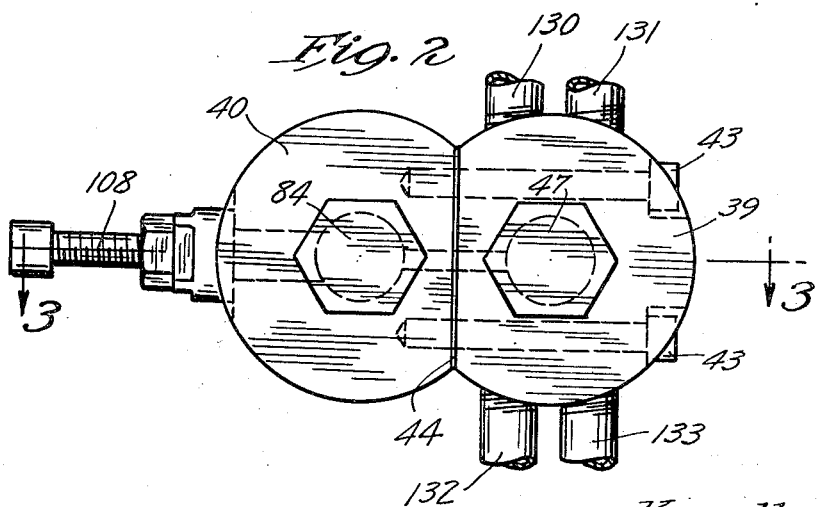
INVENTOR.
Kenneth A. Albers
BY
Merchant & Merchant
ATTORNEYS

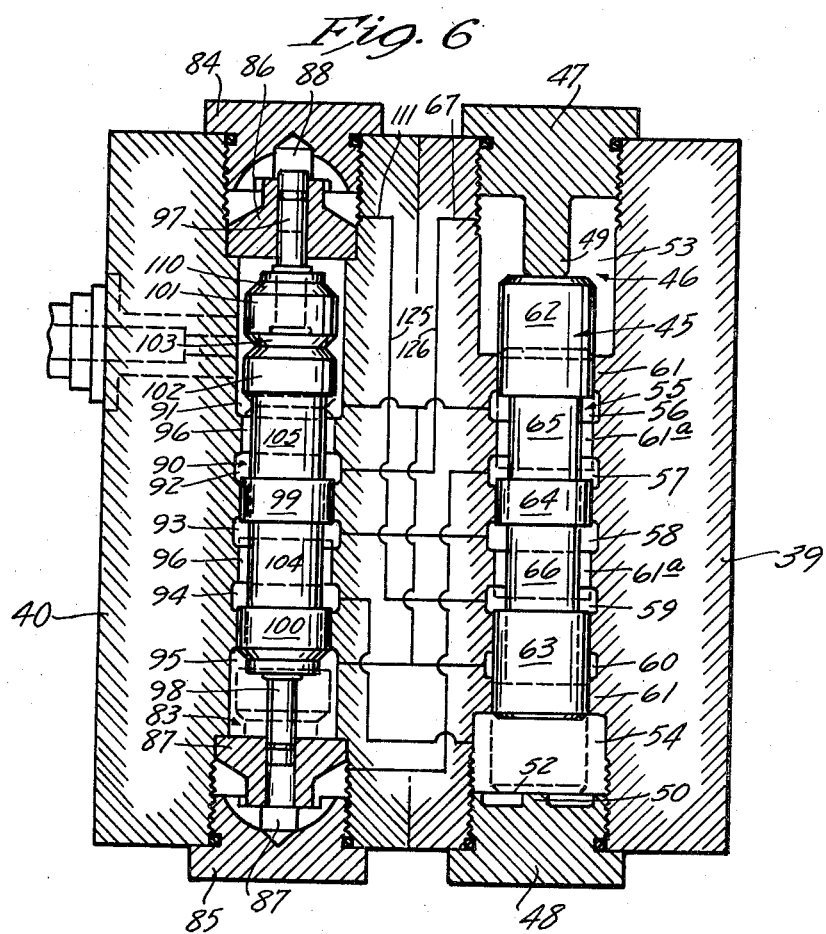

United States Patent Office 2,773,486
Patented Dec. 11, 1956

2,773,486

VALVE MEANS FOR A FLUID PRESSURE SYSTEM

Kenneth A. Albers, Minneapolis, Minn., assignor to Char-Lynn Co., Minneapolis, Minn., a corporation of Minnesota Application February 16, 1955, Serial No. 488,552

2 Claims. (Cl. 121—158)

My invention relates to a novel and improved valve means for fluid pressure system. In particular, it relates to an improved valve means, comprising a servo-responsive reversing valve and servo valve, adapted to control the transmission of fluid pressure alternately to the opposite ends of the cylinder of a fluid motor.

It is an object of my invention to provide novel and improved valve means, for a fluid pressure system, comprising a reversing valve adapted to control the transmission of fluid pressure to the opposite ends of the cylinder of a fluid motor, and a servo-valve adapted to effect a positive operation of said reversing valve when actuated by the increase of the fluid pressure at either end of the cylinder to a predetermined value.

It is a further object of my invention to provide novel and improved valve means, for a fluid pressure system, comprising an integrated structure defining a reversing valve, a servo-valve adapted to control the operation of said reversing valve, and the necessary connecting passages between said valves to provide simple positive and effective means for controlling the transmission of fluid pressure from a source consisting of a reservoir and a pump to the opposite ends of the cylinder of a fluid motor.

It is still another object of my invention to provide valve means of the type described of a novel and improved structure for providing a compact, effective, easily manufactured and commercially desirable valve.

It is a further object of my invention to provide a valve of the type described comprising a housing structure formed in two body sections each having a flat side disposed in face to face relationship with portions of valve passages being formed in these flat sides; and wherein the two body sections are connected together into an integrated housing structure.

These and other objects and advantages will be apparent from the following specification and claims, reference being had to the accompanying drawings wherein:

Fig. 1 is a schematic showing of my novel and improved fluid pressure system;

Fig. 2 is a top plan view of the valve structure of my invention showing in fragment conduits leading therefrom;

Fig. 3 is a slightly enlarged view in vertical longitudinal section, with some parts broken away, taken on the line 3—3 of Fig. 2;

Fig. 4 is a view in vertical cross section taken on and viewed in the direction indicated by the line 4—4 of Fig. 3;

Fig. 5 is a view in vertical cross section taken on and viewed in the direction indicated by the line 5—5 of Fig. 3; and Fig. 6 is a view partly in vertical longitudinal section similar to Fig. 3 and partly in schematic to clarify the passage connections between the parts of the valve structure of my invention.

Referring now to the drawings, wherein like parts will be indicated by the same numeral, and referring particularly to Fig. 1, my novel and improved fluid pressure system comprises and is for the purpose of effecting the operation of a fluid motor indicated by the numeral 10, which comprises a cylinder 11 and a double-acting piston 12 mounted in the cylinder 11 for reciprocating movement responsive to the admission of fluid under pressure alternately into the chambers 13 and 14 at the opposite ends 15 and 16 of the cylinder 11.

A pair of conduits 17 and 18 are connected at their ends 19 and 20 to the ends 15 and 16, respectively, of the cylinder 11 for alternately transmitting fluid under pressure into chambers 13 and 14 and discharging fluid therefrom. The opposite ends 21 and 22 of conduits 17 and 18 are connected to and in communication with a servo-valve responsive, fluid pressure operated, reversing valve 23. A source of fluid under pressure comprises a reservoir of fluid 24 connected by conduit 25 to a pump 26. A passage or conduit 27 extending from the pressure side of the pump 26 leads into a branch conduit 28 which is connected to and in communication with the reversing valve 23 and leads into a branch conduit or passage 29 which is connected to and in communication with a servo-valve 30. A passage or conduit 31 extending from the reservoir 24 leads into a branch passage or conduit 32 which is connected to and in communication with the reversing valve 23 and leads into a branch passage or conduit 33 which is connected to and in communication with the servo-valve 30. A passage or conduit 34 is connected to and in communication with servo-valve 30 and extends to the conduit 17; also, a passage or conduit 35 extends between servo-valve 30 and conduit 18. A passage or conduit 36 extends between servo-valve 30 and reversing valve 23; and a second conduit or passage 37 extends between servo-valve 30 and reversing valve 23.

The specific structure comprising reversing valve 23 and servo-valve 30 and the passages or conduits extending therebetween and their operation will be subsequently pointed out; however, a brief explanation of the operation of my fluid pressure system will be given with reference to the schematic disclosure of my invention shown in Fig. 1 and as described above, which will be of assistance in understanding the broad aspects of my improved fluid pressure system and in understanding the specific embodiment of my invention hereinafter described.

Reversing valve 23 is movable between two positions to alternately admit the piston-operating fluid from the pressure side of pump 26 into the conduits 17 and 18 and thus alternately into the chambers 13 and 14 of the cylinder 11. The positive operation of reversing valve 23 is effected by servo-valve 30 which is actuated by the increase of the fluid pressure at either end of the cylinder 11 to a predetermined value.

At one position of reversing valve 23 chamber 13 is in communication with the pressure side of pump 26 through passages 27 and 28, reversing valve 23, and conduit 17, whereby the piston-operating fluid from pump 26 is transmitted to the end 15 of cylinder 11; also, at this position of reversing valve 23, chamber 14 is in communication with the reservoir 24 through passages 31 and 32, reversing valve 23, and conduit 18 to discharge fluid from end 16 of the cylinder 11 to the reservoir 24. At this position of reversing valve 23, there is communication through passage 36, servo-valve 30 and passages 29 and 27 from the pump 26 to one end of reversing valve 23 which fluid pressure acts to maintain reversing valve 23 in the position aforesaid; also, there is communication between the other end of reversing valve 23 and the reservoir 24 through passage 37, servo-valve 30, and passages 33 and 31. At this position of reversing valve 23 there is also communication between servo-valve 30 and the pressure within chamber 13 through conduit 17 and passage 34, which in effect is the fluid pressure at the pressure side of the pump 26; and likewise, at this position of reversing valve 23, there is communication between the other end of servo-valve 30 and the reservoir 24 through passage 35 and conduit 18, which is in communication with reservoir 24.

When the pressure within chamber 13 increases to a predetermined value, this predetermined value of pressure being transmitted to the servo-valve 30 by passage 34 as aforementioned, it actuates servo-valve 30. This actuation of servo-valve 30 causes passage 36 to discontinue communication with branch passage 29 as aforesaid and to be in communication with branch passage 33 and causes passage 37 to discontinue communication with branch passage 33 and to be in communication with branch passage 29. This reversal of communication of passages 36 and 37 with branch passages 29 and 33 causes the pump pressure at the predetermined value which actuated servo-valve 30 to be transmitted through servo-valve 30 and conduit 37 to reversing valve 23, and this effects a reversal of the position of reversing valve 23. This change in position of reversing valve 23 causes conduits 17 to discontinue communication with branch passage 28 and to be in communication with branch conduit 32 and conduit 18 to discontinue communication with branch passage 32 and to be in communication with branch conduit 28 which effects a reversal of the communication between the conduits 17 and 18 and the passages to the pump 26 and reservoir 24 so that now the piston-operating fluid is transmitted to chamber 14 instead of chamber 13, chamber 13 now being in communication with the reservoir 24, which effects a reversal in the direction of movement of the piston 12.

When the pressure within chamber 14 increases to a predetermined value, this pressure, transmitted to servo-valve 30 through conduit 18 and passage 35, actuates servo-valve 30 so that its parts will assume their original position; wherein, passage 36 in communication with branch passage 29 and passage 37 in communication with branch passage 33 causes the pressure of the fluid from pump 26, at the predetermined value which actuated servo-valve 30, to be transmitted through passage 36 to reversing valve 23 to again effect a change in position of reversing valve 23, so that again conduit 18 comes into communication with branch passage 32 and conduit 17 into communication with branch passage 28 to produce a complete cycle of operation.

Referring now in particular to Figs. 2–6, the specific structure comprising the reversing valve 23 and servo-valve 30 of my novel and improved fluid pressure system is disclosed. Reversing valve 23 and servo-valve 30 are formed into an integrated valve structure indicated in its entirety by the general reference numeral 38. Valve structure 38 comprises a pair of housings 39 and 40 which are generally cylindrically-shaped, less than whole but greater than semi-cylindrical in shape, and which have generally rectangularly-shaped flat faces 41 and 42, respectively. A plurality of bolts 43, and as preferably shown herein there are four such bolts, extend through housing 39 to housing 40 to bind the housings 39 and 40 together into the integrated structure 38 with faces 41 and 42 in abutting relationship. A gasket 44, see Fig. 2, between adjoining faces 41 and 42, is not shown in detail but is properly formed to permit communication between the housings as will be subsequently explained and to form a seal or tight joint between the housings 39 and 40 which prevents the leakage of any fluid from the proper channels through which it is directed.

Housing 39 defines the valve casing of reversing valve 23, which is a piston-type valve comprising a plunger 45 mounted for longitudinal reciprocating movement within a longitudinally extending bore or cavity 46, which is closed by caps 47 and 48. Caps 47 and 48 have inwardly projecting reduced ends 49 and 50 respectively, the former being much longer than the latter, which define abutment surfaces 51 and 52 limiting the movement of plunger 45 in each direction. Plunger 45 is the movable part of reversing valve 23 and is movable alternately in opposite directions between two positions by means subsequently pointed out. The first position of plunger 45 is the extent of its movement in the direction limited by abutment surface 51, and its second position is the extent of its movement in the opposite direction limited by the abutment surface 52.

Cavity 46 alternates between an enlarged diameter and a reduced diameter to define pressure chambers 53 and 54 adjacent its opposite ends, and intermediate said pressure chambers a plurality of longitudinally spaced valve chambers 55, preferably there are five such valve chambers 55 indicated individually by the numerals 56, 57, 58, 59 and 60. Pressure chambers 53 and 54 and valve chambers 55 are connected by reduced bore portions 61.

Plunger 45 is formed with enlarged ends 62 and 63, an enlarged central portion 64, and intermediate reduced portions 65 and 66 disposed between central portion 64 and each of the reduced ends 62 and 63. The diameter of enlarged ends 62 and 63 and enlarged central portion 64 fits the reduced bore portions 61 to prevent the flow of fluid therethrough when the enlarged portions of plunger 45 are positioned therein. Enlarged ends 62 and 63 prevent communication between pressure chambers 53 and 54 and the adjacent valve chambers 56 and 60, respectively, regardless of the position of plunger 45.

Reduced bore portions 61 of the cavity 46 between the longitudinally spaced valve chambers 55 define passages or valve ports, indicated by the numeral 61a, which are alternately open and shut at both positions of the plunger 45 and each passage 61a is alternately opened and closed by the movement of plunger 45 between its two positions, previously defined. Referring in particular to Fig. 6, at the first position of plunger 45, which is indicated in full lines, reduced portion 65 is within the passage 61a between valve chambers 56 and 57, which is the open position of this passage or valve port; enlarged portion 64 is within the passage 61a between valve chamber 57 and 58, which is the closed position of this passage or valve port; reduced portion 66 is within the passage 61a between valve chamber 58 and 59, which is the open position of this passage; and enlarged portion 63 is within the passage 61a between valve chambers 59 and 60, which is the closed position of this passage. Referring to the dotted line position of plunger 45 in Fig. 6, the plunger is shown at its second position; and at this position, the passages or valve ports 61a which were formerly open at the first defined position of plunger 45 are now closed, and the passages 61a which were formerly closed are now open.

A plurality of passages extend radially outwardly in longitudinally spaced parallel relationship from cavity 46 to the face 41 of housing 39. Specifically, referring to Figs. 3 and 5, a passage 67 extends from pressure chamber 53 to a port opening 68 at face 41; a passage 69 extends from valve chamber 55 to a port opening 70; a passage 71 extends from valve chamber 57 to the port opening 72; a passage 73 extends from valve chamber 58 to a port opening 74; a passage 75 extends from valve chamber 59 to a port opening 76; a passage 77 extends from valve chamber 60 to a port opening 78; and a passage 79 extends from pressure chamber 54 to a port opening 80. A longitudinally extending channel 81 formed in face 41 of housing 39 connects the slot-like port openings 70 and 78.

Housing 40 defines the valve casing of servo-valve 30 which in many respects is similar in construction to reversing valve 23. Servo-valve 30 is a piston-type valve comprising a plunger 82 mounted for longitudinal reciprocating movement within a longitudinally extending bore or cavity 83 formed in the housing 40 and which is closed at its opposite ends by cap members 84 and 85. A pair of oppositely disposed spindle supports 86 and 87 are held in position against shoulders or abutments formed in the housing 40 by the cap members 84 and 85 in inwardly spaced relation to said cap members. A pressure chamber 88 is defined by a space between cap member 84 and spindle support 86; and similarly, a pressure chamber 89 is defined by the space between cap member 85 and spindle support 87. Cavity 83 between spindle supports 86 and 87 alternates between an enlarged diameter and a reduced diameter to define a plurality of longitudinally spaced valve chambers 90 intermediate the pressure chambers 88 and 89 and separated therefrom by the spindle supports 86 and 87; preferably, there are five such valve chambers 90 indicated individually by the numerals 91, 92, 93, 94 and 95. Valve chambers 90 are connected by reduced bore portions of cavity 83 to define passages or valve ports 96.

Plunger 82 has a pair of oppositely disposed spindles 97 and 98 secured thereto which are mounted in the spindle supports 86 and 87, respectively, to mount and guide plunger 82 for longitudinal movements in opposite directions between the two positions shown in full and dotted lines in Fig. 6. Plunger 82 is formed with an enlarged central portion 99, an enlarged portion 100 adjacent spindle 98, enlarged portions 101 and 102 adjacent spindle 97 and separated by a V-shaped groove 103, and a pair of reduced portions 104 and 105 disposed between central portion 99 and enlarged portions 100 and 102 respectively.

An adjustment for regulating the operation of servo-valve 30 is carried by a plug 106 threaded into the housing 40 and comprising a detent pawl or catch 107, an adjusting screw 108, and a spring 109 interposed between adjusting screw 108 and detent pawl 107. Detent pawl 107 is engageable in groove 103 to define one position of servo-valve 30 and engages the beveled cam-acting surface 110 adjacent enlarged portion 101 of plunger 82 to define the second position of plunger 82. Detent pawl 107 is cammed out of latching engagement with groove 103 or surface 110 in a laterally outwardly direction against the bias of spring 109 by a force applied alternately to the opposite ends of plunger 82 effected by predetermined pressure within the pressure chambers 88 and 89. The amount of force necessary to actuate plunger 82 against the latching bias of detent pawl 107 is determined by the adjustment of adjusting screw 108.

The enlarged portions 99, 100 and 102 of plunger 82 fit the reduced bore portions defining passages 96 to prevent the flow of fluid therethrough when the enlarged portions of the plunger 82 are positioned therein. Passages or valve ports 96 are alternately open and shut at both positions of the plunger 82 and each passage 96 is alternately opened and closed by the movement of plunger 82 between its two positions, previously defined. Specifically, referring in particular to Fig. 6, at one position of plunger 82, which is shown in Fig. 3 and in full lines in Fig. 6, and wherein detent pawl 107 is in engagement with groove 103, reduced portion 105 is within the passage 96 between valve chambers 91 and 92, which is the open position of this passage or valve port 96; enlarged portion 99 is within the passage 96 between valve chamber 92 and 93, which is the closed position of this passage or valve port; reduced portion 104 is within the passage 96 between valve chamber 93 and 94, which is the open position of this passage or valve port; and enlarged portion 100 is within the passage 96 between valve chamber 94 and 95, which is the closed position of this passage or valve port. Referring in particular to the dotted line position of plunger 82 in Fig. 6, the plunger is shown at its second position wherein detent pawl 107 is in engagement with cam surface 110; and at this position, the passages or valve ports 96 which were formerly open are now closed and the passages 96 which were formerly closed are now open.

A plurality of passages extend radially outwardly in longitudinally spaced parallel relationship from cavity 83 to the face 42 of housing 40. Specifically, referring in particular to Figs. 3 and 4, a passage 111 extends from pressure chamber 88 to the port opening 112 at face 42; a passage 113 extends from valve chamber 91 to a port opening 114; a passage 115 extends from valve chamber 92 to the port opening 116; a passage 117 extends from valve chamber 93 to a port opening 118; a passage 119, see Fig. 4, extends from the valve chamber 94, see Fig. 3, to the port opening 120; a passage 121 extends from valve chamber 95 to a port opening 122; and a passage 123 extends from pressure chamber 89 to a port opening 124. Face 42 of housing 40 is channeled to provide communication between the port openings at face 42 and the port openings at face 41 of housing 39 as follows: A channel 125 extends generally longitudinally inwardly from port opening 112 to communicate with port opening 76; a channel 126 extends generally longitudinally outwardly from port opening 68 to communicate with port opening 116; a channel 127 is adapted to cooperate with channel 81 to provide communication between the four port openings 114, 122, 70 and 78; a channel 128 extends generally longitudinally inwardly from port opening 124 to communicate with port opening 72; and a channel 129 extends generally longitudinally outwardly from port opening 119 to communicate with port opening 80. To clarify the connections through the passages, channels and port openings between the reversing valve 23 and servo-valve, 30, these connections are shown schematically in Fig. 6.

A conduit 130 extends from valve chamber 56 and is adapted to be connected to the reservoir 24, and is shown schematically in Fig. 1 as passages 31 and 32. A conduit 131 extends from valve chamber 58 and is adapted to be connected to the pressure side of the pump 26 and is shown schematically in Fig. 1 as passages 27 and 28. Conduits 132 and 133 extend from valve chambers 59 and 57, respectively, and are adapted to be connected to the opposite ends of cylinder 11, 16 and 15 respectively, and are shown schematically in Fig. 1 as conduits 17 and 18.

The operation of this specific form of the servo-valve 30 and reversing valve 23 of my novel and improved fluid pressure system is as follows: Valve chamber 57 is in communication with side 15 of cylinder 11 through conduit 133. Valve chamber 59 is in communication with side 16 of cylinder 11 through conduit 132. The valve chambers on either side of valve chambers 57 and 59 are in communication with reservoir 24 and pump 26 as follows: Valve chamber 58 is in communication with pump 26 through conduit 131, and valve chambers 56 and 60, connected together through passage 69, port opening 70, channels 81 and 127, port opening 78 and passage 77, are in communication with reservoir 24 through conduit 132.

At the position of plunger 45 of reversing valve 23 shown in full lines in Fig. 6, valve port 61a between valve chamber 59 and 60 is closed, valve port 61a between valve chamber 59 and 58 is open, valve port 61a between valve chamber 58 and 57 is closed, and valve port 61a between valve chambers 57 and 56 is open. Therefore, valve chamber 59 being in communication with valve chamber 58 is connected to the pressure side of pump 26, and valve chamber 57 in communication with valve chamber 56 is connected to the reservoir 24. Thus, at the position of plunger 45 shown in full lines in Fig. 6, the pressure side of pump 26 is in communication with chamber 14 of cylinder 11 to admit the piston-operating fluid under pressure from pump 26, and chamber 13 of cylinder 11 is in communication with the reservoir 24 to discharge fluid from chamber 13 to the reservoir 24 as piston 12 is moved toward end 15 by the fluid pressure in chamber 14.

The positive operation of reversing valve 23 wherein plunger 45 is moved from its first position, shown in full lines in Fig. 6, to its second position, shown in dotted lines in Fig. 6, is effected under the control of servo-valve 30 in a manner subsequently explained when the pressure in chamber 14 reaches a predetermined value. At the second position of plunger 45 of reversing valve 23, shown in dotted lines in Fig. 6, valve port 61a between valve chamber 60 and 59 is open, valve port 61a between valve chamber 59 and 58 is closed, valve port 61a between valve chamber 58 and 57 is open, and valve port 61a between valve chambers 57 and 56 is closed. Therefore, valve chamber 57 in communication with valve chamber 58 is connected to the pressure side of pump 26, and valve chamber 59 in communication with valve chamber 60 is in communication with reservoir 24. Thus, at the position of plunger 45 shown in dotted lines in Fig. 6, chamber 13 of cylinder 11 is connected to the pressure side of pump 26 to admit the piston-operating fluid from pump 26, and chamber 14 of cylinder 11 is in communication with the reservoir 24 to discharge the fluid from chamber 14 to the reservoir 24. The positive operation of reversing valve 23, wherein plunger 45 is positively movable between the two positions shown in Fig. 6, is adapted to alternately admit the piston-operating fluid from pump 26 alternately into the chambers 13 and 14 of the cylinder 11 to effect the reciprocating movement of piston 12.

The positive operation of reversing valve 23 is effected by the admission of fluid under pressure from pump 26 at a predetermined value alternately into the pressure chambers 53 and 54 under the control of servo-valve 30.

Pressure chamber 53 is in communication with valve chamber 92 through passage 67, valve port 68, channel 126, valve port 116 and passage 115. Pressure chamber 54 is in communication with valve chamber 94 through passage 79, valve port 80, channel 129, valve port 120 and passage 119. The valve chambers on either side of valve chambers 92 and 94 are in communication with reservoir 24 and pump 26 as follows: Valve chamber 93 is in communication with the pressure side of pump 26 as it is connected to valve chamber 58 of reversing valve 23 through passage 73, valve port 74, valve port 118, and passage 117; valve chambers 81 and 95 are in communication with the reservoir 24 by their connection with channels 127 and 81 through passages 113 and 121 and valve ports 114 and 122.

At the position of plunger 82 of servo-valve 30 shown in full lines in Fig. 6, valve port 96 between valve chambers 95 and 94 is closed, valve port 96 between valve chambers 94 and 93 is open, valve port 96 between valve chambers 93 and 92 is closed, and valve port 96 between valve chambers 92 and 91 is open. Valve chamber 92 is in communication with valve chamber 91, which is connected to the reservoir 24, and valve chamber 92 is connected to pressure chamber 53; and therefore, pressure chamber 53 is in communication with the reservoir 24. Valve chamber 94 is in communication with valve chamber 93, which is connected to the pressure side of pump 26, and valve chamber 94 is in communication with the pressure chamber 54 of reversing valve 23; and therefore, pressure chamber 54 is in communication with the pressure side of pump 26. Thus, at the position of plunger 82 shown in full lines in Fig. 6, plunger 45 of reversing valve 23 is maintained in its position, also shown in full lines in Fig. 6, by the low pressure of reservoir 24 in pressure chamber 53 and the higher pressure from the pump 26 in pressure chamber 54. When servo-valve 30 is actuated in a manner subsequently explained, plunger 82 moves from the full line position shown in Fig. 6 to the dotted line position shown in Fig. 6. At this latter position, valve port 96 between valve chambers 95 and 94 is open, valve port 96 between valve chambers 94 and 93 is closed, valve port 96 between valve chambers 93 and 92 is open, and valve port 96 between valve chambers 92 and 91 is closed. Thus, valve chamber 92, which is in communication with pressure chamber 53, is no longer connected to reservoir 24 through valve chamber 91, but rather is in communication with valve chamber 93 and therefore connected to the pressure side of pump 26. Also, valve chamber 94, which is in communication with pressure chamber 54, is no longer connected to pump 26 through valve chamber 93 but rather is in communication with valve chamber 95 and therefore connected to the reservoir 24. Thus, the actuation of servo-valve 30 has effected a reversal of the connections of pressure chambers 53 and 54 to the reservoir 24 and pump 26. Pressure chamber 53 being in communication with pump 26 and pressure chamber 54 being in communication with the reservoir 24 causes the plunger 45 of the reversing valve 23 to move from its full line position shown in Fig. 6 to its dotted line position shown in Fig. 6. As will be subsequently pointed out, the pressure of the fluid at the pressure side of the pump 26 is at a predetermined value at the time that servo-valve 30 effects a reversal of the connections of pressure chambers 53 and 54 to the reservoir 24 and pump 26, so that the pressure from pump 26 being transmitted to the pressure chamber 53 being at this predetermined value effects a positive and effective operation of reversing valve 23.

Servo-valve 30 is actuated by the increase of the fluid pressure at either end of the cylinder 11 to a predetermined value. Pressure chamber 88 of servo-valve 30 is in communication with side 16 and chamber 14 of cylinder 11 through passage 111, port 112, channel 125, port 76, passage 75, valve chamber 59 of reversing valve 23, and conduit 132. Pressure chamber 89 of servo-valve 30 is in communication with side 15 and chamber 13 of cylinder 11 through passage 123, port opening 124, channel 128, port opening 72, passage 71, valve chamber 57 of reversing valve 23, and conduit 133. When plunger 82 of servo-valve 30 is in the position shown in full lines in Fig. 6, plunger 45 of reversing valve 23 as afore-mentioned is also in the position shown in full lines in Fig. 6; and at this full line position of plunger 45, side 16 and chamber 14 of cylinder 11 are in communication with pump 26, and side 15 and chamber 13 of cylinder 11 are in communication with the reservoir 24. As the pressure within chamber 14 is directly transmitted to pressure chamber 88 of servo-valve 30, the increase of pressure within chamber 14 through the force of pump 26 is transmitted to pressure chamber 88; and when this pressure is increased to a value sufficient to overcome the latching bias of detent 107, the plunger 82 of servo-valve 30 is moved from the full line position of Fig. 6 to the dotted line position of Fig. 6. As aforementioned, this movement or actuation of servo-valve 30 causes the positive operation of reversing valve 23 to move plunger 45 to the dotted line position of Fig. 6, which reverses the connections between the pump 26 and the reservoir 24 to the opposite ends 15 and 16 of cylinder 11 to cause a reversal in the movement of piston 12. Upon the operation of reversing valve 23 so that plunger 45 is at its dotted line position of Fig. 6, chamber 13 and end 15 of cylinder 11 are now connected to the pressure side of pump 26 and this pressure is directly transmitted to the pressure chamber 89 of servo-valve 30. When the pressure within chamber 14 reaches a predetermined value sufficient to overcome the latching bias of detent 107 engaging cam surface 110, servo-valve 30 is again actuated to move plunger 82 from its dotted line position of Fig. 6 to the full line position of Fig. 6. The movement of plunger 82 from its dotted line position shown in Fig. 6 to its full line position shown in Fig. 6 again effects a reversal of the connections of pressure chambers 53 and 54 to the reservoir 24 and pump 26. Pressure chamber 54 now being in communication with the pressure pump 26, which is at the predetermined value actuating servo-valve 30, and pressure chamber 53 now being in communication with reservoir 24. This causes plunger 45 of reversing valve 23 to move from its dotted line position shown in Fig. 6 to its full line position shown in Fig. 6 to again reverse the connection of conduits 132 and 133 to the reservoir 24 and pump 26, which concludes the description of a complete cycle of operation.

In further explanation of the fact that reversing valve 23 is operated when the pressure of pump 26 is at a predetermined value, it is clear that servo-valve 30 is actuated when the pressure of the pressure side of pump 26 is at this predetermined value, the actual value of pressure actuating plunger 82 being determined by the adjustment of screw 108; and it is only upon actuation of servo-valve 30 that the pressure from pump 26 is directed to the proper pressure chamber of reversing valve 23 to effect the movement of plunger 45.

My invention has been built and tested and found to accomplish all of the afore-mentioned objectives and advantages. It will be obvious to those skilled in the art that my invention may be modified by many substitutions and equivalents and that this disclosure is intended to be illustrative only. Therefore, I intend to be limited solely by the scope of the appended claims.

What I claim is:

1. Automatic reversing valve means for a fluid pressure system comprising housing structure defining a pair of spaced longitudinally extending cylindrical cavities each having five longitudinally spaced radially enlarged portions intermediate the ends of said cavities which define valve chambers, the opposite ends of said cavities defining pressure chambers, the pressure and valve chambers of each cavity being separated one from another by reduced bore portions of the cavity; said housing structure defining: a passage from the central valve chamber of one cavity to the central valve chamber of the other cavity, a pair of passages each from a different one of the two valve chambers on each side of the central valve chamber of said one cavity to and communicating with a different one of the pressure chambers of said other cavity, a pair of passages each from a different one of said two valve chambers to a different one of two outlet ports adapted to be connected to the opposite ends of the cylinder of a fluid motor, a pair of passages each from a different one of the two valve chambers on either side of the central valve chamber of said other cavity to and communicating with a different one of the pressure chambers of said one cavity, passages interconnecting the four end valve chambers of said cavities, a fluid pressure inlet port, a fluid pressure outlet port, a passage connecting one of said fluid pressure ports to the interconnected end valve chambers, and a passage connecting the other fluid pressure port to the connected central valve chambers; two longitudinally extending cylindrical valve plungers each mounted for reciprocating movement in a different one of said cavities between two positions, each plunger having longitudinally extending end portions thereof in engagement with the structure defining the reduced portions of its associated cavity which are between the end valve chambers and pressure chambers thereof for preventing communication between the pressure chambers and end valve chambers of said cavities during the movement of said plungers, said plungers having alternating normal and reduced diameter portions, the normal portions of said plungers engaging portions of said structure defining reduced bore portions of said cavities for preventing communication between adjacent valve chambers and said reduced diameter portions of said plungers permitting communication between two adjacent valve chambers, the normal and reduced portions of said plungers being so disposed with respect to said cavities that each intermediate valve chamber is in communication with the valve chamber on one side thereof and not in communication with the valve chamber on the other side thereof at one position of each plunger and so that at the other position of each plunger communication between adjacent valve chambers is reversed and each intermediate valve chamber is not in communication with said valve chamber on the one side thereof and is in communication with said valve chamber on the other side thereof; and means for releasably latching the plunger mounted for movement in said other cavity at each of the two positions between which said plunger is movable.

2. The structure defined in claim 1 in which said housing structure comprises a pair of interconnected longitudinally extending body sections each having a flat side disposed in face to face relationship, portions of said passages being defined by slots formed in said flat sides, and in further combination with gasket means for preventing fluid leakage between said flat sides.

References Cited in the file of this patent

UNITED STATES PATENTS

| | | |
|---|---|---|
| 1,952,690 | Strom | Mar. 27, 1934 |
| 2,069,122 | Weaver | Jan. 26, 1937 |
| 2,192,402 | Gruetjen | Mar. 5, 1940 |
| 2,451,983 | Seward et al. | Oct. 19, 1948 |
| 2,613,652 | Ziegelmeyer | Oct. 14, 1952 |

FOREIGN PATENTS

| | | |
|---|---|---|
| 992,359 | France | July 11, 1951 |